United States Patent
Elias et al.

(10) Patent No.: US 10,205,683 B2
(45) Date of Patent: Feb. 12, 2019

(54) OPTIMIZING BUFFER ALLOCATION FOR NETWORK FLOW CONTROL

(71) Applicant: Mellanox Technologies TLV Ltd., Raanana (IL)

(72) Inventors: George Elias, Tel Aviv (IL); Barak Gafni, Kfar Malal (IL); Ran Ravid, Tel Aviv (IL); Ido Bukspan, Herzliya (IL); Zachy Haramaty, Hemed (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 15/081,969

(22) Filed: Mar. 28, 2016

(65) Prior Publication Data
US 2017/0279741 A1 Sep. 28, 2017

(51) Int. Cl.
*H04L 12/24* (2006.01)
*H04L 12/861* (2013.01)
*H04L 12/26* (2006.01)
*H04L 12/825* (2013.01)

(52) U.S. Cl.
CPC .......... *H04L 49/9005* (2013.01); *H04L 43/16* (2013.01); *H04L 47/25* (2013.01)

(58) Field of Classification Search
CPC ......... H04L 47/10; H04L 43/16; H04L 47/11; H04L 47/521; H04L 47/30; H04L 43/0894; H04L 47/25
USPC ..... 370/235, 232, 401, 230.1, 229, 231, 253
See application file for complete search history.

(56) References Cited

U.S. PATENT DOCUMENTS

| | | | |
|---|---|---|---|
| 6,108,713 A * | 8/2000 | Sambamurthy | H04L 29/06 370/463 |
| 6,178,448 B1 * | 1/2001 | Gray | H04L 45/00 370/468 |
| 6,594,263 B1 * | 7/2003 | Martinsson | H04J 3/247 370/395.42 |
| 7,321,553 B2 | 1/2008 | Prasad et al. | |
| 7,346,059 B1 | 3/2008 | Garner et al. | |
| 7,738,454 B1 | 6/2010 | Panwar et al. | |

(Continued)

FOREIGN PATENT DOCUMENTS

EP  1720295 A1  11/2006
EP  2466476 A1  6/2012
(Continued)

OTHER PUBLICATIONS

Hahne et al., "Dynamic Queue Length Thresholds for Multiple Loss Priorities", IEEE/ACM Transactions on Networking, vol. 10, No. 3, pp. 368-380, Jun. 2002.

(Continued)

*Primary Examiner* — Charles C Jiang
*Assistant Examiner* — Will W Lin
(74) *Attorney, Agent, or Firm* — D.Kligler IP Services Ltd.

(57) ABSTRACT

Communication apparatus includes a memory, which is configured to hold data packets, having respective packet sizes, for transmission over a data link, and a transmitter, which is configured to transmit the data packets over the data link at a bit rate determined by a wire speed of the data link. A shaper is coupled to throttle transmission of the data packets by the transmitter responsively to the respective packet sizes, whereby some of the data packets are transmitted over the data link at a transmission rate that is less than the bit rate.

22 Claims, 3 Drawing Sheets

(56) References Cited

U.S. PATENT DOCUMENTS

| | | | |
|---|---|---|---|
| 7,821,939 B2* | 10/2010 | DeCusatis | H04L 47/10 370/229 |
| 8,078,743 B2 | 12/2011 | Sharp et al. | |
| 8,345,548 B2 | 1/2013 | Gusat et al. | |
| 8,473,693 B1 | 6/2013 | Muppalaneni et al. | |
| 8,576,715 B2 | 11/2013 | Bloch et al. | |
| 8,630,294 B1 | 1/2014 | Keen et al. | |
| 8,767,561 B2 | 7/2014 | Gnanasekaran et al. | |
| 8,811,183 B1 | 8/2014 | Anand et al. | |
| 8,879,396 B2 | 11/2014 | Guay et al. | |
| 8,989,017 B2 | 3/2015 | Naouri | |
| 8,995,265 B2* | 3/2015 | Basso | H04L 47/56 370/232 |
| 9,014,006 B2 | 4/2015 | Haramaty et al. | |
| 9,325,619 B2 | 4/2016 | Guay et al. | |
| 9,356,868 B2* | 5/2016 | Tabatabaee | H04L 47/11 |
| 9,426,085 B1* | 8/2016 | Anand | H04L 49/25 |
| 2002/0055993 A1 | 5/2002 | Shah et al. | |
| 2002/0191559 A1* | 12/2002 | Chen | H04W 72/08 370/329 |
| 2003/0108010 A1* | 6/2003 | Kim | H04L 1/0006 370/333 |
| 2003/0223368 A1 | 12/2003 | Allen et al. | |
| 2004/0008714 A1 | 1/2004 | Jones | |
| 2005/0053077 A1 | 3/2005 | Blanc et al. | |
| 2005/0169172 A1 | 8/2005 | Wang et al. | |
| 2005/0216822 A1 | 9/2005 | Kyusojin et al. | |
| 2005/0226156 A1* | 10/2005 | Keating | H04L 47/10 370/235 |
| 2005/0228900 A1 | 10/2005 | Stuart et al. | |
| 2006/0087989 A1 | 4/2006 | Gai et al. | |
| 2006/0088036 A1 | 4/2006 | De Prezzo | |
| 2006/0092837 A1 | 5/2006 | Kwan et al. | |
| 2006/0092845 A1* | 5/2006 | Kwan | H04L 47/50 370/235 |
| 2007/0097257 A1* | 5/2007 | El-Maleh | H04N 21/23406 348/419.1 |
| 2007/0104102 A1 | 5/2007 | Opsasnick | |
| 2007/0104211 A1 | 5/2007 | Opsasnick | |
| 2007/0201499 A1 | 8/2007 | Kapoor et al. | |
| 2007/0291644 A1 | 12/2007 | Roberts et al. | |
| 2008/0037420 A1* | 2/2008 | Tang | H04L 1/1607 370/229 |
| 2008/0175146 A1 | 7/2008 | Van Leekwuck et al. | |
| 2008/0192764 A1 | 8/2008 | Arefi et al. | |
| 2009/0207848 A1 | 8/2009 | Kwan et al. | |
| 2010/0220742 A1 | 9/2010 | Brewer et al. | |
| 2013/0014118 A1 | 1/2013 | Jones | |
| 2013/0039178 A1 | 2/2013 | Chen et al. | |
| 2013/0250757 A1* | 9/2013 | Tabatabaee | H04L 47/266 370/230 |
| 2013/0250762 A1 | 9/2013 | Assarpour | |
| 2013/0275631 A1 | 10/2013 | Magro et al. | |
| 2013/0286834 A1* | 10/2013 | Lee | H04L 47/326 370/235 |
| 2013/0305250 A1 | 11/2013 | Durant | |
| 2014/0133314 A1 | 5/2014 | Mathews et al. | |
| 2014/0269274 A1 | 9/2014 | Banavalikar et al. | |
| 2014/0269324 A1 | 9/2014 | Tietz et al. | |
| 2015/0026361 A1 | 1/2015 | Matthews et al. | |
| 2015/0124611 A1 | 5/2015 | Attar et al. | |
| 2015/0127797 A1 | 5/2015 | Attar et al. | |
| 2015/0180782 A1 | 6/2015 | Rimmer et al. | |
| 2015/0200866 A1 | 7/2015 | Pope et al. | |
| 2015/0381505 A1 | 12/2015 | Sundararaman et al. | |
| 2016/0135076 A1 | 5/2016 | Grinshpun et al. | |
| 2017/0118108 A1 | 4/2017 | Avci et al. | |
| 2017/0142020 A1 | 5/2017 | Sundararaman et al. | |
| 2017/0180261 A1* | 6/2017 | Ma | H04L 47/25 |
| 2017/0187641 A1 | 6/2017 | Lundqvist et al. | |
| 2017/0295112 A1 | 10/2017 | Cheng et al. | |
| 2018/0205653 A1 | 7/2018 | Wang et al. | |

FOREIGN PATENT DOCUMENTS

| | | |
|---|---|---|
| WO | 2009107089 A2 | 9/2009 |
| WO | 2013136355 A1 | 9/2013 |
| WO | 2013180691 A1 | 12/2013 |

OTHER PUBLICATIONS

Choudhury et al., "Dynamic Queue Length Thresholds for Shared-Memory Packet Switches", IEEE/ACM Transactions Networking, vol. 6, Issue 2 , pp. 130-140, Apr. 1998.

Gafni et al., U.S. Appl. # 14/672,357, filed Mar. 30, 3015.

Ramakrishnan et al., "The Addition of Explicit Congestion Notification (ECN) to IP", Request for Comments 3168, Network Working Group, 63 pages, Sep. 2001.

IEEE Standard 802.1Q™-2005, "IEEE Standard for Local and metropolitan area networks Virtual Bridged Local Area Networks", 303 pages, May 19, 2006.

Infiniband TM Architecture, Specification vol. 1, Release 1.2.1, Chapter 12, pp. 657-716, Nov. 2007.

IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for PAUSE Operation, Annex 31B (MAC Control PAUSE operation), pp. 763-772, year 2005.

IEEE Std 802.1Qbb., IEEE Standard for Local and metropolitan area networks—"Media Access Control (MAC) Bridges and Virtual Bridged Local Area Networks—Amendment 17: Priority-based Flow Control", 40 pages, Sep. 30, 2011.

Elias et al., U.S. Appl. # 14/718,114, filed May 21, 2015.

Gafni et al., U.S. Appl. # 15/075,158, filed Mar. 20, 2016.

Shpiner et al., U.S. Appl. # 14/967,403, filed Dec. 14, 2015.

Elias et al., U.S. Appl. # 14/994,164, filed Jan. 13, 2016.

Aibester et al., U.S. Appl. # 15/063,527, filed Mar. 8, 2016.

Kriss et al., U.S. Appl. # 15/161,316, filed May 23, 2016.

Roitshtein et al., U.S. Appl. # 14/961,923, filed Dec. 8, 2015.

CISCO Systems, Inc., "Priority Flow Control: Build Reliable Layer 2 Infrastructure", 8 pages, 2015.

Gran et al., "Congestion Management in Lossless Interconnection Networks", Submitted to the Faculty of Mathematics and Natural Sciences at the University of Oslo in partial fulfillment of the requirements for the degree Philosophiae Doctor, 156 pages, Sep. 2013.

Pfister et al., "Hot Spot Contention and Combining in Multistage Interconnect Networks", IEEE Transactions on Computers, vol. C-34, pp. 943-948, Oct. 1985.

Zhu et al.,"Congestion control for large-scale RDMA deployments", SIGCOMM'15, pp. 523-536, Aug. 17-21, 2015.

CISCO Systems, Inc.,"Advantage Series White Paper Smart Buffering", 10 pages, 2016.

Hoeiland-Joergensen et al., "The FlowQueue-CoDel Packet Scheduler and Active Queue Management Algorithm", Internet Engineering Task Force (IETF) as draft-ietf-aqm-fq-codel-06 , 23 pages, Mar. 18, 2016.

U.S. Appl. # 14/718,114 Office Action dated Sep. 16, 2016.

U.S. Appl. # 14/672,357 Office Action dated Sep. 28, 2016.

U.S. Appl. # 14/994,164 office action dated Jul. 5, 2017.

U.S. Appl. # 15/075,158 office action dated Aug. 24, 2017.

European Application # 17172494.1 search report dated Oct. 13, 2017.

European Application # 17178355 search report dated Nov. 13, 2017.

U.S. Appl. # 15/063,527 office action dated Feb. 8, 2018.

U.S. Appl. # 15/161,316 office action dated Feb. 7, 2018.

U.S. Appl. # 14/967,403 office action dated Nov. 9, 2017.

U.S. Appl. # 15/432,962 office action dated Apr. 26, 2018.

U.S. Appl. # 15/161,316 Office Action dated Jul. 20, 2018.

U.S. Appl. No. 15/432,962 office action dated Nov. 2, 2018.

U.S. Appl. No. 15/469,652 office action dated Nov. 2, 2018.

U.S. Appl. No. 15/161,316 Office Action dated Dec. 11, 2018.

* cited by examiner

OPTIMIZING BUFFER ALLOCATION FOR NETWORK FLOW CONTROL

FIELD OF THE INVENTION

The present invention relates generally to packet communication networks, and particularly to methods and systems for flow control in such networks.

BACKGROUND

Ethernet is a family of computer network standards that are widely used in wired local area networks (LANs). These standards have been codified by the IEEE 802.3 working group and define a wide range of link-layer protocol features and medium access control (MAC) functions. The Ethernet link-layer protocol may run over a variety of underlying physical-layer (PHY) types and protocols.

In packet-switched networks, such as Ethernet, switches have buffers that facilitate lossless operation. When the rate of incoming packet rates from a source is higher than the switch can accommodate, however, data can accumulate in the buffer, and packets may be dropped due to exceeding the buffer size. To ameliorate this problem, Ethernet switches send link-level flow-control messages when the buffer fill level of a particular queue or ingress port and priority exceeds a specified threshold, called the XOFF threshold. The flow-control message is sent to the source of the packets to instruct the source to stop transmitting packets.

For this purpose, Annex 31B of the IEEE 802.3 specification defines an optional flow control operation using "PAUSE" frames. When the receiver on a given link transmits a PAUSE frame to the transmitter, it causes the transmitter to temporarily stop all transmission on the link (except certain control frames) for a period of time that is specified in the PAUSE frame. This pause command mechanism enables the receiver to recover from states of buffer overfill.

Recently, a number of new IEEE standards for data center bridging (DCB) have been proposed, offering enhanced Ethernet flow control capabilities. For example, the IEEE 802.1Qbb project authorization request (PAR) provides priority-based flow control (PFC) as an enhancement to the pause mechanism described above. PFC creates eight separate virtual links on a given physical link and allows the receiver to issue commands that pause and restart the virtual links independently. PFC thus enables the operator to implement differentiated quality of service (QoS) policies for the eight virtual links, meaning that each virtual link may correspond to a different class of service.

Due to delays in receiving and acting on flow-control messages at the transmitter, the receiving switch (also referred to in this context simply as the "receiver") will continue receiving frames from the source for a certain amount of time even after transmitting the XOFF (PAUSE) message. In view of this delay, a portion of the switch buffer is normally reserved to admit the packets that may arrive after the flow-control message is sent. This reserved buffer is referred to as the lossless headroom or, simply, headroom. Typically, each virtual link receives its own headroom allocation, although in some schemes, headroom allocations are shared among different virtual links and even different ports.

A receiver using PFC must predict when the headroom buffer of any given virtual link is nearing exhaustion and send a PAUSE frame to the transmitter when this condition arises. There will always be a certain lag, however, between when the PAUSE frame is generated and when the transmitter actually stops transmission. For lossless service, the receiver must have sufficient residual buffer space available to store any residual packets that the transmitter has transmitted or is in the process of transmitting between the time the receiver decides to send the PAUSE frame and the time the transmitter actually receives the PAUSE frame and ceases transmission.

The buffer requirements for this sort case are analyzed in a white paper published by Cisco Systems Inc. (San Jose, Calif.), entitled "Priority Flow Control: Build Reliable Layer 2 Infrastructure" (September, 2015). The paper explains that the receiver must send a PAUSE frame for a given class of service (CoS) when the receiver buffer space drops below a certain threshold, which is determined by the sum of the maximum transmission unit (MTU) sizes of both the transmitter and the receiver, the response time of the transmitter, and the speed (or equivalently, bandwidth) and length of the wire between the transmitter and receiver. The PFC standard limits the response time contribution to the threshold to 3840 bytes, while at 10 Gbps, the round-trip transmission time of the wire contributes another 1300 bytes to the threshold per 100 meters of cable. The threshold may also be affected by the sizes of the buffer units (referred to as "cells") that are allocated to hold incoming packets, such as 80 or 160 bytes, in comparison with the sizes of the packets that may be received and stored.

SUMMARY

Embodiments of the present invention that are described hereinbelow provide improved techniques for flow-control buffering and apparatus implementing such techniques.

There is therefore provided, in accordance with an embodiment of the invention, communication apparatus, including a memory, which is configured to hold data packets, having respective packet sizes, for transmission over a data link, and a transmitter, which is configured to transmit the data packets over the data link at a bit rate determined by a wire speed of the data link. A shaper is coupled to throttle transmission of the data packets by the transmitter responsively to the respective packet sizes, whereby some of the data packets are transmitted over the data link at a transmission rate that is less than the bit rate.

In some embodiments, the shaper is configured to throttle the transmission so that the packets of a first size are transmitted at a first transmission rate, and packets of a second size, larger than the first size, are transmitted at a second transmission rate, which is greater than the first transmission rate. In a disclosed embodiment, the shaper is configured to throttle the transmission so that the packets of a predefined worst size are transmitted at a minimal transmission rate relative to the packets of other sizes. Typically, the data packets are transmitted over the data link to a receiver having a receive buffer that is divided into cells of a predefined cell size, and the worst size is defined as a packet size that makes least efficient use of the cell size, relative to all other packet sizes.

Additionally or alternatively, the shaper is configured to refrain from throttling large data packets, for which the respective packet sizes are greater than a predefined threshold, whereby the large data packets are transmitted over the data link at the wire speed. Further additionally or alternatively, the shaper is configured to throttle the transmission by rounding up the size of each packet to a predefined round-up size, while applying different round-up sizes to different packet size ranges.

Typically, the data packets are transmitted over the data link to a receiver having a receive buffer that is divided into cells of a predefined cell size, wherein the shaper is configured to throttle the transmission by a throttling factor that depends upon a comparison of the packet sizes to the cell size. In a disclosed embodiment, the throttling factor is selected so that a number of the cells in the receive buffer that is consumed by the transmitted data packets per unit time is no greater than a predefined maximum.

In the disclosed embodiments, the data packets are transmitted over the data link to a receiver, and the transmitter is configured to temporarily stop the transmission of the data packets upon receipt of a pause frame over the data link from the receiver. In one embodiment, the data packets in the memory are queued to be transmitted by the transmitter in multiple, different traffic classes, and the transmitter is configured to temporarily stop the transmission in one or more of the traffic classes that are indicated by the pause frame, and wherein stopping the transmission in one of the traffic classes causes the shaper to throttle the transmission of the data packets in another of the traffic classes. Additionally or alternatively, the different traffic classes include at least first and second classes, and the shaper is configured to throttle the transmission of the data packets in the first class but not in the second class.

There is also provided, in accordance with an embodiment of the invention, a method for communication, which includes queuing data packets, having respective packet sizes, for transmission over a data link by a transmitter, which is configured to transmit the data packets at a bit rate determined by a wire speed of the data link. Transmission of the data packets by the transmitter is throttled responsively to the respective packet sizes, whereby some of the data packets are transmitted over the data link at a transmission rate that is less than the bit rate.

The present invention will be more fully understood from the following detailed description of the embodiments thereof, taken together with the drawings in which:

DETAILED DESCRIPTION OF EMBODIMENTS

Figure 1:
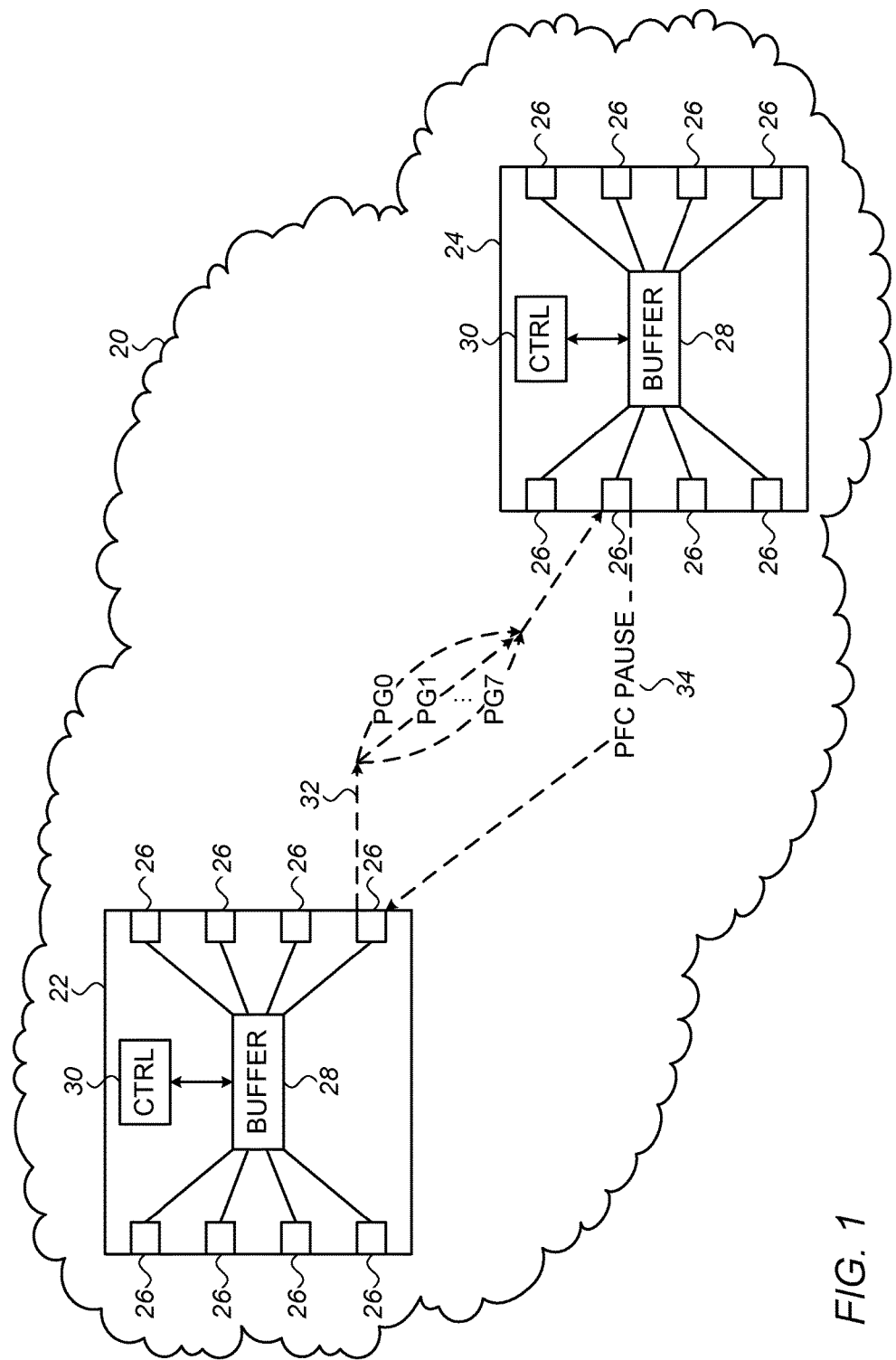
FIG. 1 is block diagram that schematically illustrates a communication network in which flow control is implemented between a pair of switches, in accordance with an embodiment of the invention.

Packet buffers are commonly divided into cells of a certain, predefined size, which in turn defines the minimum memory transaction unit. Typically, if an incoming packet is larger than the cell size, it is segmented into cells first, and then these cells are stored in free buffer slots through a sequence of memory transactions. The cell size introduces a certain inefficiency into management of the buffer, since a partially-filled cell wastes storage capacity. For example, a packet of minimal size (typically 64 bytes in Ethernet networks, for example) will always occupy an entire cell, and a packet whose size is one byte greater than the cell size will occupy two cells.

Cell size has a significant role in determining the amount of headroom buffer space required for lossless flow control mechanisms, such as those that defined by the above-cited Annex 31B of IEEE 802.3 and IEEE 802.1Qbb. Taking cell size into account, while allowing for reception of packets of any size between the minimum size and the MTU, requires allocation of a headroom buffer that is at least twice as large as the amount of memory space that will actually be occupied by the packet data.

Specifically, as noted earlier, the amount of memory space required at the receiver for actual packet data (not accounting for unused parts of buffer cells) is given roughly by the formula:

$$RoundTripBytes = 2*MTU + (RTT+TRT)*BW$$

wherein the MTU is assumed to be the same for the transmitter and the receiver, RTT is the round-trip time of the cable, TRT is the transmitter response time, and BW is the bandwidth (or equivalently wire speed) of the data link. The ratio between the required buffer allocation and the amount of memory space that is actually occupied by packet data is determined by the ratio of the cell size to the worst packet size, i.e., the packet size that makes the least efficient use of the buffer cells. This ratio is equal to at least two (which is the case when the worst packet size is equal to the cell size+1 byte) and may be greater than two when the cell size is more than twice the minimum packet size, in which case the worst packet size is the minimum packet size (for example, cell size 160 bytes in comparison with the 64-byte minimum packet size in Ethernet).

More precisely, taking the cell size into account, the headroom buffer allocation for each lossless class of traffic on a data link should be at least:

$$MinBuffer = \frac{RoundTripBytes}{WorstPktSize} * Roundup\left[\frac{WorstPktSize}{CellSize}\right] * CellSize$$

wherein RoundUp rounds its operand up to the next greater integer. This buffering requirement can strain the memory resources of the receiver and/or limit the length of the cable that a given receiver can support.

Some embodiments of the present invention that are described herein address this problem by throttling the transmission of data packets by the transmitter, with a throttling factor that depends upon a comparison of the sizes of the packets that are actually transmitted to the cell size. The term "throttle" is used in the present description and in the claims to mean reducing the speed of transmission of data over a data link to a transmission rate that is less than the full bit rate at which the link is capable of carrying data, as determined by the wire speed. The throttling factor is the ratio of the reduced transmission rate to the full bit rate. The throttling factor can be set as a function of the packet size, for example, so that the number of the cells in the receive buffer that is consumed per unit time by the transmitted data packets will be no greater than a predefined maximum regardless of the packet size. Controlling the rate of cell consumption in this manner allows the receiver to allocate a smaller amount of headroom, while still ensuring that the headroom will be sufficient to hold all of the packets received by the receiver after issuing a pause frame, even when the transmitted packets are all of the worst packet size.

This use of throttling at the transmitter makes it possible to allocate headroom buffer space in the receiver that is equal to or only moderately greater than RoundTripBytes. The transmitter will still be allowed to transmit large packets, which use buffer space efficiently, at or close to the full wire speed, while flows of smaller packets will be throttled. Thus, the system operator can choose the headroom buffer size flexibly, in a tradeoff against throughput of small packets, with assurance that the buffer allocation will be sufficient to support lossless operation. When multiple, different traffic classes are transmitted over a link, different throttling factors may be applied to different classes, and throttling based on packet size may be applied to the transmission of the data packets in one class but not another.

In the embodiments of the present invention that are described hereinbelow, the above techniques are implemented in communication apparatus such as a switch in a packet network. The apparatus comprises a memory, which holds data packets for transmission over a data link, and a transmitter, which is capable of transmitting the data packets over the link at a bit rate that is determined by a wire speed of the data link. A shaper, however, throttles the transmission of the data packets by the transmitter in response to the respective packet sizes, so that some of the data packets—depending on the packet sizes—are transmitted over the data link at a transmission rate that is less than the bit rate of the link.

In the disclosed embodiments, as explained above, the shaper throttles the transmission so that certain smaller packets are transmitted at a transmission rate less than that of other, larger packets. Packets of the worst packet size, as defined above, are transmitted at a minimal transmission rate relative to the packets of other sizes. As long as sufficient buffer space is allocated at the receiver, however, large packets, whose sizes are greater than a predefined threshold, may be transmitted over the data link at the full wire speed.

Alternatively, the shaper may be configured to implement other sorts of throttling schemes based on packet size. Such schemes may be designed to optimize the tradeoff between packet size, buffer allocation, and transmission rate, as explained above. As noted above, the throttling scheme implemented by the shaper may be chosen based on considerations relating to quality of service, multi-class support, and efficient use of link and memory resources. All such alternative implementations are considered to be within the scope of the present invention.

FIG. 1 is block diagram that schematically illustrates a communication network 20 in which flow control is implemented on a data link 32 between a pair of switches 22 and 24, in accordance with an embodiment of the invention. Switches 22 and 24 comprise multiple ports 26, which are connected via links of network 20 to communicate with peer devices, although only these two switches and the single link 32 from switch 22 to switch 24 are shown for the sake of simplicity. Thus, in the description that follows, switch 22 will be regarded as the transmitter, while switch 24 is regarded as the receiver. In practice, link 32 typically carries data packets in both directions between switches 22 and 24, in full duplex mode, so that both switches actually play the roles of both transmitter and receiver. Optionally, the switches differentiate packet flows by classes of service, identified in FIG. 1 as priority groups PG0, . . . , PG7, i.e., up to eight different priority levels in this example, each transmitted on its own virtual link within data link 32.

Switches 22 each comprise a memory 28 and control logic 30. For the purposes of transmission from switch 22 to switch 24, memory 28 in switch 22 serves as the transmit buffer, holding data packets for transmission over data link 32. Memory 28 in switch 24 serves as the receive buffer, and includes headroom allocations for the various links and classes of service. Although memories 28 are shown, for the sake of simplicity, as unitary blocks, in practice the memories may be divided into multiple physical banks, which may be centralized or, alternatively, associated with particular ports 26. Within memory 28, headroom may be allocated separately to individual ports and/or classes of service, as well as shared among different ports and/or classes of service. Headroom sharing schemes that may be applied in this context are described, for example, in U.S. patent application Ser. No. 14/718,114, filed May 21, 2015, whose disclosure is incorporated herein by reference.

Control logic 30 handles activities in switches 22 and 24 that include packet forwarding, allocation of buffers in memory 28, and flow-control operations, such as managing thresholds, transmitting pause frames 34, controlling packet transmission rates, and dropping packets as necessary. Pause frames 34 may cause switch 22 to interrupt transmission of all data packets on data link 32 as a whole, or they may apply separate pause instructions to different traffic classes when PFC is supported (as described above and shown in FIG. 1). In either case, switch 24 transmits pause frame 34 to switch 22 over data link 32 when the remaining headroom available for a given class of service or for the data link as a whole drops below the XOFF threshold. Considerations relating to setting the sizes of headroom allocations, along with the corresponding XOFF threshold, and concomitant control of the packet transmission rate are described further hereinbelow.

Although control logic 30 is shown in FIG. 1, for the sake of simplicity, as a single, centralized functional block, the functions of this logic are typically distributed among a central controller and individual port logic units that are associated with ports 26. The functions of logic 30 may be implemented in hard-wired or programmable logic circuits or in one or more programmable processing units, driven by software or firmware, or in a combination of such elements. The description that follows will focus on certain flow-control functions and related control of transmission rates. Other, conventional functions of logic 30 will be apparent to those skilled in the art and are beyond the scope of the present description.

Figure 2:
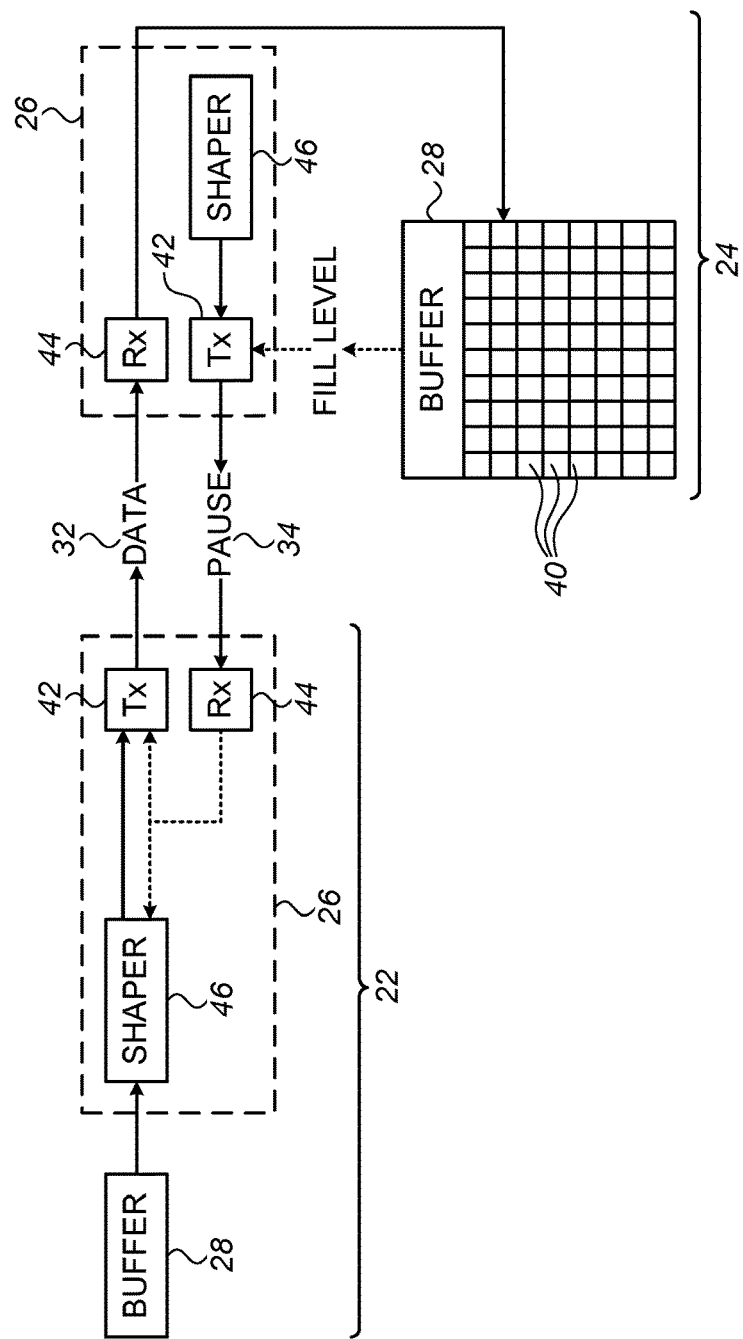
FIG. 2 is a block diagram that schematically shows details of a pair of switches implementing a flow control scheme in accordance with an embodiment of the invention.

FIG. 2 is a block diagram that schematically shows details of switches 22 and 24, used in implementing a flow control scheme in accordance with an embodiment of the invention. In the description that follows, switch 22 will be referred to as the transmitting switch, while switch 24 is referred to as the receiving switch, although as noted above, both of the switches typically both transmit and receive packets over data link 32. Furthermore, the principles of this embodiment may be implemented not only in Ethernet switches, but also in other sorts of network apparatus that executes pause-based flow control, whether in accordance with IEEE 802.3 protocols or other applicable protocols that are known in the art.

Memory 28 in receiving switch 24 comprises a headroom buffer, which is divided into cells 40 of a certain fixed size. The cell size is typically determined by considerations of logic design within switch 24, and may range, for example, between 80 bytes and 208 bytes. Data write and read transactions to and from memory 28 are performed in units of cells 40. Thus, when port 26 receives a data packet over link 32, it stores the packet in a single cell when the packet size is less than or equal to the cell size, or divides the packet data among two or more cells when the packet is larger.

When the packet data (from a single small packet or part of a larger packet) in a given cell consumes less than the entire cell, the remainder of the cell remains vacant. When switch 24 forwards a given packet onward to network 20, the corresponding cells 40 are freed to receive further data.

Each of ports 26 comprises a transmitter 42 and a receiver 44. Transmitter 42 in switch 22 reads and transmits data packets from the transmit buffer in memory 28. Receiver 44 in switch 24 writes the packet data to cells 40 in the headroom buffer in its own memory 28 and instructs transmitter 42 in switch 24 to issue pause frame 34 when the remaining free headroom drops below an XOFF threshold determined by the headroom allocation. As explained above, for lossless operation, the headroom allocation for any given class of service on data link 32 (or for the link as a whole) should be no less than the value of RoundTripBytes, and will typically be increased above this value to account for memory inefficiencies due to the mismatch between packet sizes and the size of cells 40.

Transmitter 42 and receiver 44 are typically capable of transmitting and receiving data packets over data link 32 at a bit rate that is determined by the wire speed of the data link, for example, 10 Gbps. A shaper 46, however, throttles transmission of the data packets by transmitter on the basis of the sizes of the packet to be transmitted. As a result, some of the data packets are transmitted over the data link at a transmission rate that is less than the bit rate. The dashed arrows from receiver 44 to transmitter 42 and shaper 46 in switch 22 represent that upon receipt of pause frame 34, receiver 44 will accordingly stop transmission by transmitter 42, and that receiver 44 may also convey instructions to shaper 46 based on signaling received from switch 24.

The throttling factor applied by shaper 46 depends, inter alia, on the sizes of cells 40. Specifically, as explained earlier, shaper 46 effectively rounds up the size of each packet by an amount selected so that the number of the cells 40 in the receive buffer that is consumed by the transmitted data packets per unit time is no greater than a predefined maximum. As a result, certain smaller packets will be transmitted at a lower transmission rate than larger packets, with packets of the worst size (which make least efficient use of cells 40, as defined above) transmitted at the lowest rate.

The choice of the round-up size to be applied by shaper 46 depends on the desired tradeoff between memory use in receiving switch 24 and throughput of data link 32. For example, when the round-up size is set to be equal to the cell size, it will be sufficient to allocate RoundTripBytes of headroom in memory 28, but the transmission rate of packets on the data link will be throttled down by a factor that can reach RoundUp[WorstPktSize/CellSize]*CellSize/WorstPktSize when a stream of packets of the worst size is transmitted. Alternatively, setting a smaller round-up size will require a larger headroom allocation but will achieve higher link throughput.

Shaper 46 can be configured to apply different round-up sizes to different packet size ranges, in order to better tune the tradeoff between bandwidth and buffer. For example, it possible to define two ranges: one for packets smaller than a given threshold, such as 10*CellSize, in which case the round-up is to CellSize, and a second range for packet sizes above the threshold, in which no round-up is applied at all. As a result, large data packets, above the threshold, are transmitted over data link 32 at the wire speed. The buffer size needed in this case for lossless operation is 10% larger than RoundTripBytes.

Although shaper 46 can be configured statically for a certain mode and parameters of operation, in general it is desirable that the shaper be configurable in accordance with the requirements of receiving switch 24 and data link 32. Configuration of shaper 46 may be carried out automatically by negotiation between switches 22 or 24 and/or manually by the operator of network 20. For example, the throttling factor applied by shaper 46 on any given data link may be adjusted depending upon the sizes of cells 40 and memory availability in the receiving switch and upon the link throughput requirements. Shaper 46 will typically be activated to throttle transmission only when ports 26 on data link 32 are configured to send and receive pause frames 34, since otherwise the shaping function will not be needed (or at least will not be needed for the purpose of lossless flow control). When PFC is supported, shaper 46 may be configured to throttle transmission only for those (lossless) classes of services that are subject to flow control, and not for other (lossy) classes.

Additionally or alternatively, when headroom is shared among different priority groups on data link 32, the XOFF threshold may depend on the buffer occupancy of the shared allocation, as described in the above-mentioned U.S. patent application Ser. No. 14/718,114, for example. In this case, shaper 46 may be activated dynamically, during communications over link 32, only when one of the priority groups is paused, indicating that there is pressure on the headroom allocation, while otherwise allowing transmission to proceed at the full wire speed. In other words, when a PFC pause frame stops the transmission in one of the traffic classes, it will also cause shaper 46 to throttle the transmission of the data packets in one or more other traffic classes.

Figure 3:
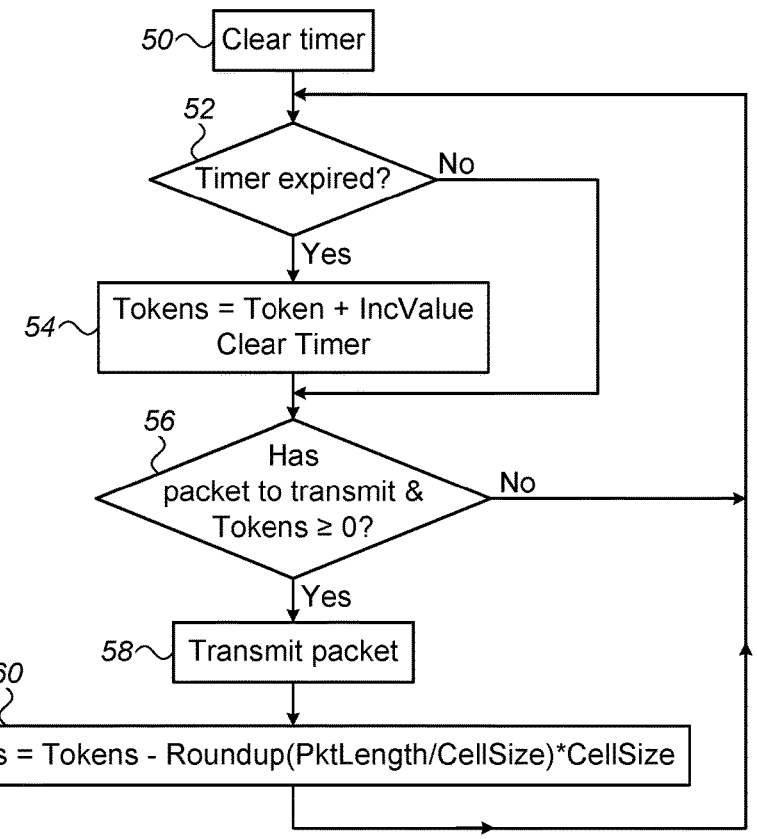
FIG. 3 is a flow chart that schematically illustrates a method for transmission bandwidth shaping, in accordance with an embodiment of the invention.

FIG. 3 is a flow chart that schematically illustrates a method for transmission bandwidth shaping, in accordance with an embodiment of the invention. This method can be applied by shaper 46 as a means for implementing the rounding up of packet size that is described above. The method operates by issuing tokens of a size equal to the cell size at intervals determined by the maximum rate at which cells 40 in the receive buffer are allowed to be consumed (depending on the size of the headroom allocation at the receiver, as explained above). Shaper 46 applies the method to data link 32 as a whole or to each class of service that is subject to throttling, and releases a packet to transmitter 42 only when there are tokens available for the link or class.

Shaper 46 initiates the method of FIG. 3 by clearing the token release timer, at a timer initiation step 50. Shaper 46 intermittently checks whether the timer has expired, at a timer checking step 52. When the timer expires, shaper 46 increments the number of tokens available for transmission, at a token issuance step 54. The timer expiration value depends, as explained above, on the permitted rate of cell consumption, and the timer is cleared each time a new token is issued.

After incrementing the token count, shaper 46 checks whether there is a packet awaiting transmission, at a packet checking step 56. If so, and the token count is greater than or equal to zero, shaper 46 releases the packet for transmission, at a packet transmission step 58. The shaper reduces the token count by the number of cells that will be consumed by the packet, i.e., by a number equal to RoundUp[PktLength/CellSize]*CellSize, at a count reduction step 60. The process then returns to step 52 to accumulate further tokens.

Figure 4:
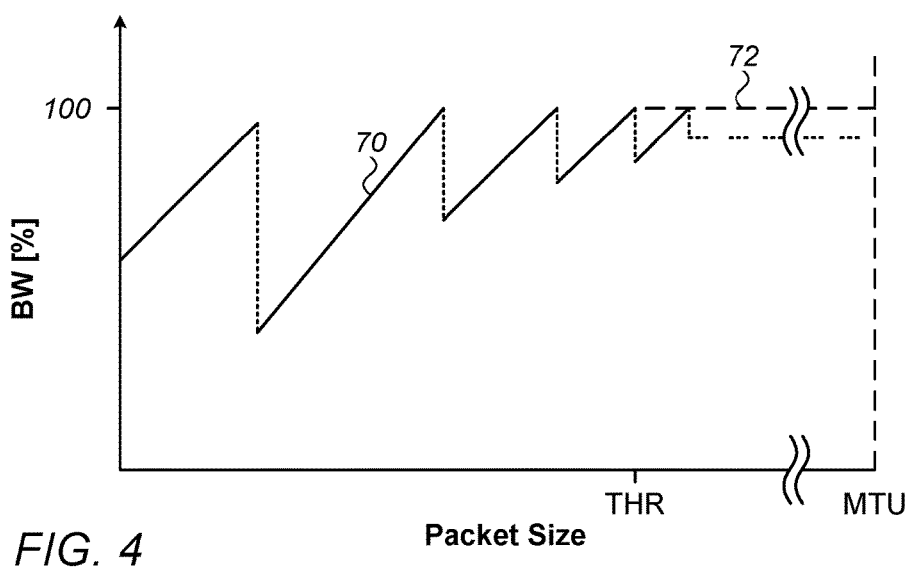
FIG. 4 is a plot of transmission bandwidth as a function of packet size in an implementation of a bandwidth shaping scheme, in accordance with an embodiment of the invention.

FIG. 4 is a plot of transmission bandwidth as a function of packet size in an implementation of a bandwidth shaping scheme by shaper 46, in accordance with an embodiment of the invention. The bandwidth (BW) is shown as a percentage of the full wire speed. A sawtooth line shows how the bandwidth (or equivalently, the transmission rate) varies between 100% for packets whose size is a multiple of the cell size, and a minimum transmission rate for packets of the worst packet size, which makes least efficient use of the cell size.

Optionally, as explained above, shaper 46 is configured to transmit packets of sizes greater than a given threshold at the full wire speed. This range of operation, at 100% bandwidth, is illustrated by a line 72 in FIG. 4.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
 a memory, which is configured to hold data packets, having respective packet sizes, for transmission over a data link;
 a transmitter, which is configured to transmit the data packets from the memory over the data link to a receiver, at a bit rate determined by a wire speed of the data link; and
 a shaper, which is coupled between the memory and the transmitter, and configured to select packets from the memory to be throttled responsively to a comparison of the respective packet sizes to a cell size of a receive buffer of the receiver and to throttle the transmission of the selected data packets by reducing the rate of the packets from the memory to the transmitter, whereby some of the data packets are transmitted over the data link at a transmission rate that is less than achievable by the bit rate.

2. The apparatus according to claim 1, wherein the shaper is configured to throttle the transmission so that the packets of a first size are transmitted at a first transmission rate, and packets of a second size, larger than the first size, are transmitted at a second transmission rate, which is greater than the first transmission rate.

3. The apparatus according to claim 2, wherein the shaper is configured to throttle the transmission so that the packets of a predefined worst size are transmitted at a minimal transmission rate relative to the packets of other sizes.

4. The apparatus according to claim 3, wherein the worst size is defined as a packet size that makes least efficient use of the cell size, relative to all other packet sizes.

5. The apparatus according to claim 2, wherein the shaper is configured to refrain from throttling large data packets, for which the respective packet sizes are greater than a predefined threshold, whereby the large data packets are transmitted over the data link at the wire speed.

6. The apparatus according to claim 1, wherein the shaper is configured to throttle the transmission by a throttling factor that depends upon a comparison of the packet sizes to the cell size.

7. The apparatus according to claim 6, wherein the throttling factor is selected so that a number of the cells in the receive buffer that is consumed by the transmitted data packets per unit time is no greater than a predefined maximum.

8. The apparatus according to claim 1, wherein the transmitter is configured to temporarily stop the transmission of the data packets upon receipt of a pause frame over the data link from the receiver.

9. The apparatus according to claim 8, wherein the data packets in the memory are queued to be transmitted by the transmitter in multiple, different traffic classes, and wherein the transmitter is configured to temporarily stop the transmission in one or more of the traffic classes that are indicated by the pause frame, and wherein stopping the transmission in one of the traffic classes causes the shaper to throttle the transmission of the data packets in another of the traffic classes.

10. The apparatus according to claim 1, wherein the data packets in the memory are queued to be transmitted by the transmitter in multiple, different traffic classes, including at least first and second classes, and wherein the shaper is configured to throttle the transmission of the data packets in the first class but not in the second class.

11. Communication apparatus, comprising:
 a memory, which is configured to hold data packets, having respective packet sizes, for transmission over a data link;
 a transmitter, which is configured to transmit the data packets from the memory over the data link at a bit rate determined by a wire speed of the data link; and
 a shaper, which is coupled throttle transmission of the data packets by the transmitter responsively to the respective packet sizes, whereby some of the data packets are transmitted over the data link at a transmission rate that is less than the bit rate,
 wherein the shaper is configured to throttle the transmission so that the packets of a first size are transmitted at a first transmission rate, and packets of a second size, larger than the first size, are transmitted at a second transmission rate, which is greater than the first transmission rate,
 wherein the shaper is configured to throttle the transmission by rounding up the size of each packet to a predefined round-up size, while applying different round-up sizes to different packet size ranges.

12. A method for communication, comprising:
 queuing data packets, having respective packet sizes, in a memory, for transmission over a data link to a receiver, by a transmitter, which is configured to transmit the data packets from the memory over the data link at a bit rate determined by a wire speed of the data link;
 selecting queued packets from the memory to be throttled responsively to a comparison of the respective packet sizes to a cell size of a receive buffer of the receiver, and
 throttling the transmission of the selected data packets by reducing the rate of the packets from the memory to the transmitter, whereby some of the data packets are transmitted over the data link at a transmission rate that is less than achievable by the bit rate.

13. The method according to claim 12, wherein throttling the transmission comprises transmitting the packets of a first size at a first transmission rate, and packets of a second size, larger than the first size, at a second transmission rate, which is greater than the first transmission rate.

14. The method according to claim 13, wherein transmitting the packets comprises throttling the transmission so that the packets of a predefined worst size are transmitted at a minimal transmission rate relative to the packets of other sizes.

15. The method according to claim 14, wherein the worst size is defined as a packet size that makes least efficient use of the cell size, relative to all other packet sizes.

16. The method according to claim 13, and comprising refraining from throttling large data packets, for which the respective packet sizes are greater than a predefined threshold, whereby the large data packets are transmitted over the data link at the wire speed.

17. The method according to claim 13, wherein throttling the transmission comprises rounding up the size of each packet to a predefined round-up size, while applying different round-up sizes to different packet size ranges.

18. The method according to claim 12, wherein throttling the transmission comprises applying a throttling factor that depends upon a comparison of the packet sizes to the cell size.

19. The method according to claim 18, wherein the throttling factor is selected so that a number of the cells in the receive buffer that is consumed by the transmitted data packets per unit time is no greater than a predefined maximum.

20. The method according to claim 12, wherein the method comprises temporarily stopping the transmission of the data packets upon receipt of a pause frame over the data link from the receiver.

21. The method according to claim 20, wherein the data packets in the memory are queued to be transmitted by the transmitter in multiple, different traffic classes, and wherein temporarily stopping the transmission comprises interrupting the transmission in one or more of the traffic classes that are indicated by the pause frame, and wherein stopping the transmission in one of the traffic classes causes the throttling of the transmission of the data packets in another of the traffic classes to be initiated.

22. The method according to claim 12, wherein the data packets in the memory are queued to be transmitted by the transmitter in multiple, different traffic classes, including at least first and second classes, and wherein throttling the transmission comprises applying the throttling to the data packets in the first class but not in the second class.

* * * * *